(12) United States Patent
Song et al.

(10) Patent No.: US 7,569,980 B2
(45) Date of Patent: Aug. 4, 2009

(54) THERMAL ELECTRON EMITTING BACKLIGHT UNIT

(75) Inventors: Byong-Gwon Song, Seoul (KR); Moon-Jin Shin, Yongin-si (KR)

(73) Assignee: Samsung SDI Co., Ltd., Suwon-si, Gyeonggi ( * ) Notice: Subject to any disclaimer, the term of this patent is extended or adjusted under 35 U.S.C. 154(b) by 325 days.

(21) Appl. No.: 11/545,065

(22) Filed: Oct. 10, 2006

(65) Prior Publication Data

US 2007/0085461 A1 Apr. 19, 2007

(30) Foreign Application Priority Data

Oct. 12, 2005 (KR) .................. 10-2005-0096199

(51) Int. Cl.
*H01J 1/88* (2006.01)
*H01J 1/00* (2006.01)
*H01J 1/62* (2006.01)
*H01J 9/00* (2006.01)
*H01J 9/24* (2006.01)

(52) U.S. Cl. .................. 313/292; 313/495; 313/238
(58) Field of Classification Search .............. 313/238, 313/292, 495
See application file for complete search history.

(56) References Cited

U.S. PATENT DOCUMENTS

| 4,100,449 | A  | * | 7/1978 | Gange ........................ 313/337 |
| 7,432,646 | B2 | * | 10/2008 | Choi et al. ................. 313/497 |
| 2002/0096992 | A1 | * | 7/2002 | Hsiao et al. ................. 313/495 |
| 2004/0245918 | A1 | * | 12/2004 | Lee ............................. 313/503 |
| 2005/0110383 | A1 | * | 5/2005 | Song et al. ................... 313/292 |
| 2005/0179363 | A1 |   | 8/2005 | Choi et al. |
| 2006/0232207 | A1 | * | 10/2006 | Sugimoto et al. .......... 313/582 |

* cited by examiner

*Primary Examiner*—Karabi Guharay
*Assistant Examiner*—Zachary Snyder
(74) *Attorney, Agent, or Firm*—Robert E. Bushnell, Esq.

(57) ABSTRACT

A thermal electron emission backlight unit includes: first and second substrates arranged parallel to each other; first and second anode electrodes respectively arranged on inner surfaces between the first and second substrates; wall frames adapted to seal an inner space between the first and second substrates; a movable spacer holder and a fixed spacer holder arranged inside the wall frames to face each other; a plurality of spacers arranged between the first and second substrates and adapted to maintain a gap therebetween, wherein ends of the spacers are coupled to the movable and fixed spacer holders; a plurality of cathode electrodes arranged across the spacers between the first and second substrates; and a phosphor layer arranged on the second anode electrode. The spacers include tension spacers adapted to provide tension between the movable and fixed spacer holders by pushing the movable spacer holder away from the fixed spacer holder. The first substrate is adapted to pass white light therethrough.

20 Claims, 3 Drawing Sheets

THERMAL ELECTRON EMITTING BACKLIGHT UNIT

CLAIM OF PRIORITY

This application makes reference to, incorporates the same herein, and claims all benefits accruing under 35 U.S.C. §119 from an application for BACKLIGHT DEVICE EMITTING THERMAL ELECTRON earlier filed in the Korean Intellectual Property Office on the 12 of Oct. 2005 and there duly assigned Ser. No. 10-2005-0096199.

BACKGROUND OF THE INVENTION

1. Field of the Invention

The present invention relates to a spacer holder of a thermal electron emitting backlight unit, and more particularly, to a spacer holder that maintains tension of thermal electron emitting wires and has a common electrode electrically connected to the thermal electron emitting wires in a thermal electron emitting backlight unit.

2. Description of the Related Art

A liquid crystal display (LCD) device includes a backlight unit that supplies white light onto a rear surface thereof. Conventionally, a cold cathode fluorescent lamp is used as the backlight unit. However, a flat panel type backlight unit is required for manufacturing a slim backlight unit.

A conventional backlight unit that uses a stripe-shaped electrode causes an arc discharge since the electron emission is concentrated at an edge of the stripe-shaped electrode. Thus, the conventional backlight unit has non-uniform brightness.

In a backlight unit that uses a flat panel electrode, electron emission may not uniform, thereby causing a non-uniform brightness problem in an LCD.

A method of increasing brightness of a backlight unit using a thermal electron emitting cathode has been discussed in U.S. Patent Application Publication No. US 2005/0179363 A1. However, when the thermal electron emitting cathode is mounted in a wire shape, the cathode can be thermally deformed causing a short circuit with an electrode placed above or below it. Also, a problem of the thermal electron emitting cathode disconnection can arise near a wall frame since each of the thermal electron emitting cathodes is extended outside of the wall frame to be connected to an external power source.

SUMMARY OF THE INVENTION

The present invention provides a thermal electron emitting backlight unit having an element for tensioning thermal electron emitting wires.

The present invention also provides a thermal electron emitting backlight unit having an element for preventing thermal electron emitting wires extending to the outside from being damaged by using an electrode electrically connected to the thermal electron emitting wires on a wall frame.

According to an aspect of the present invention, a thermal electron emission backlight unit is provided including: first and second substrates arranged parallel to each other; first and second anode electrodes respectively arranged on inner surfaces between the first and second substrates; wall frames adapted to seal an inner space between the first and second substrates; a movable spacer holder and a fixed spacer holder arranged inside the wall frames to face each other; a plurality of spacers arranged between the first and second substrates and adapted to maintain a gap therebetween, wherein ends of the spacers are coupled to the movable and fixed spacer holders; a plurality of cathode electrodes arranged across the spacers between the first and second substrates; and a phosphor layer arranged on the second anode electrode. The spacers include tension spacers adapted to provide tension between the movable and fixed spacer holders by pushing the movable spacer holder away from the fixed spacer holder. The first substrate is adapted to pass white light therethrough.

The wall frames facing the spacer holders preferably respectively include an upper frame and a lower frame. Common electrodes are preferably interposed between the upper and lower frames. Ends of the cathode electrodes are preferably electrically connected to the common electrodes.

Frit glass is preferably arranged on both surfaces of the upper and lower frames.

The spacer holders preferably respectively include an upper spacer holder and a lower spacer holder. The upper and lower spacer holders preferably include spacer grooves arranged where the tension spacers are coupled to the spacer holders. The spacer grooves preferably include a curved shape.

The thermal electron emission backlight unit preferably further includes cathode grooves arranged in the upper and lower spacer holders. The cathode electrodes preferably pass through the cathode grooves.

The spacers preferably include either glass or alumina ($Al_2O_3$). The spacer holders preferably include gas paths.

The second anode electrode preferably includes a highly reflective electrode. The second anode electrode preferably includes aluminum.

The thermal electron emission backlight unit preferably further includes a phosphor layer arranged on a surface of the spacers.

The spacers preferably include a conductive material and are adapted to electrically connect the first anode electrode to the second anode electrode. The spacers preferably include a non-metal bar and a reflective film arranged between a surface of the bar and the phosphor layer.

The cathode electrode preferably includes tungsten. The cathode electrode preferably has a diameter in a range of 10 µm to 250 µm.

The thermal electron emission backlight unit preferably further includes a thermal electron emitting material layer arranged on a circumference of the cathode electrode. The thermal electron emitting material layer preferably has a thickness in a range of 5 to 20 µm.

The thermal electron emission backlight unit preferably further includes a carbon material arranged on a surface of the thermal electron emitting material layer.

The thermal electron emission backlight unit preferably further includes a phosphor layer arranged on the first anode electrode. The first anode electrode and the second anode electrode preferably include flat panel shaped electrodes.

BRIEF DESCRIPTION OF THE DRAWINGS

A more complete appreciation of the present invention and many of the attendant advantages thereof, will be readily apparent as the present invention becomes better understood by reference to the following detailed description when considered in conjunction with the accompanying drawings in which like reference symbols indicate the same or similar components, wherein.

DETAILED DESCRIPTION OF THE INVENTION

Figure 1:
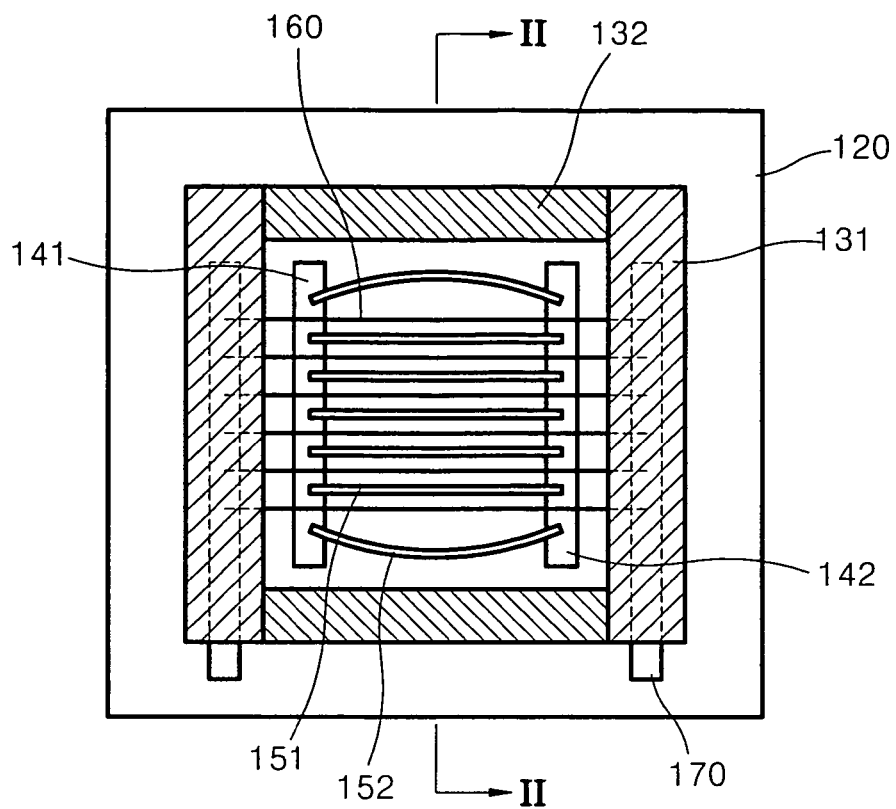
FIG. 1 is a plan view of a thermal electron emitting backlight unit according to an embodiment of the present invention.

The present invention is described more fully below with reference to the accompanying drawings in which exemplary embodiments of the present invention are shown. In the drawings, the thicknesses of layers and regions have been exaggerated for clarity.

Figure 2:
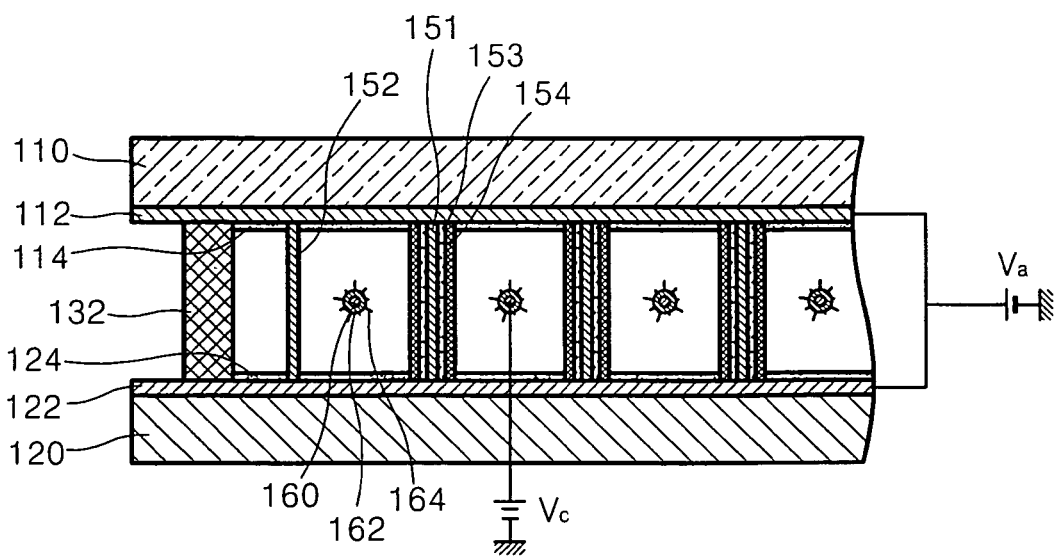
FIG. 2 is a partial cross-sectional view taken along line II-II of FIG. 1.

FIG. 1 is a plan view of a thermal electron emitting backlight unit according to an embodiment of the present invention, and FIG. 2 is a partial cross-sectional view taken along line II-II of FIG. 1. An upper substrate is not shown in FIG. 1. However, FIG. 2 shows the upper substrate.

Referring to FIGS. 1 and 2, a first substrate 110, i.e., an upper substrate, and a second substrate 120, i.e., a lower substrate, are parallel to each other with a gap of 10 to 30 mm therebetween. An outer rim of the first substrate 110 and the second substrate 120 are sealed using first and second wall frames 131 and 132. A fixed spacer holder 141 and a movable spacer holder 142 are formed parallel to each other on an inner side of the first wall frame 131. Bar shaped spacers 151 and 152 that maintain the gap between the first substrate 110 and the second substrate 120 are mounted on the fixed and movable spacer holders 141 and 142. Both ends of the spacers 151 and 152 are respectively connected to the fixed and movable spacer holders 141 and 142.

Figure 3:
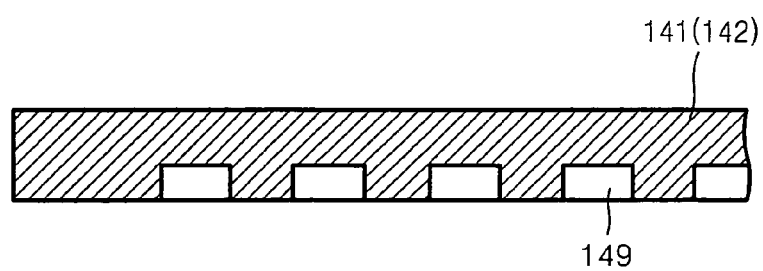
FIG. 3 is a cross-sectional view of a spacer employed in the thermal electron emitting backlight unit of FIG. 1 according to an embodiment of the present invention.

Two spacers at both sides of the bar shaped spacers are tension spacers 152 having a convex shape with respect to the second wall frames 132. The tension spacers 152 provide a restoration force in an opposite direction to the second wall frame 132. The fixed and movable spacer holders 141 and 142 can be formed of glass or alumina. The fixed and movable spacer holders 141 and 142 can include grooves 149 which serve as gas paths as depicted in FIG. 3. The gas paths can be apertures (not shown) instead of grooves. The gas path allows a gas to smoothly flow between the first substrate 110 and the second substrate 120 during a gas exhaustion process from the backlight unit.

The first substrate 110, through which light emitted from a phosphor layer 124 passes, which will be described later, is located on a rear surface of an liquid crystal display (LCD) (not shown). A first anode electrode 112, for example, a flat panel shaped indium tin oxide (ITO) transparent electrode is located on an inner surface of the first substrate 110. A second flat panel shaped anode electrode 122 is located on an inner surface of the second substrate 120.

A plurality of cathode electrodes 160 are arranged between the fixed and movable spacer holders 141 and 142. Each of the cathode electrodes 160 can have a cylindrical shape. A thermal electron emitting material layer 162, such as (Ba, Sr, Ca) $CO_3$, having a thickness of 5 to 20 µm can be formed on a circumference of the cathode electrode 160.

An electron emitting source 164, for example, a carbon material, such as Carbon Nanotubes (CNTs) or graphite powder, can be coated on the surface of the thermal electron emitting material layer 162.

The cathode electrode 160 can be formed of tungsten, with a diameter of 10 to 250 µm. The cathode electrodes 160 can be spaced at a distance of 0.5 to 15 mm from the anode electrodes 112 and 122.

Figure 4:
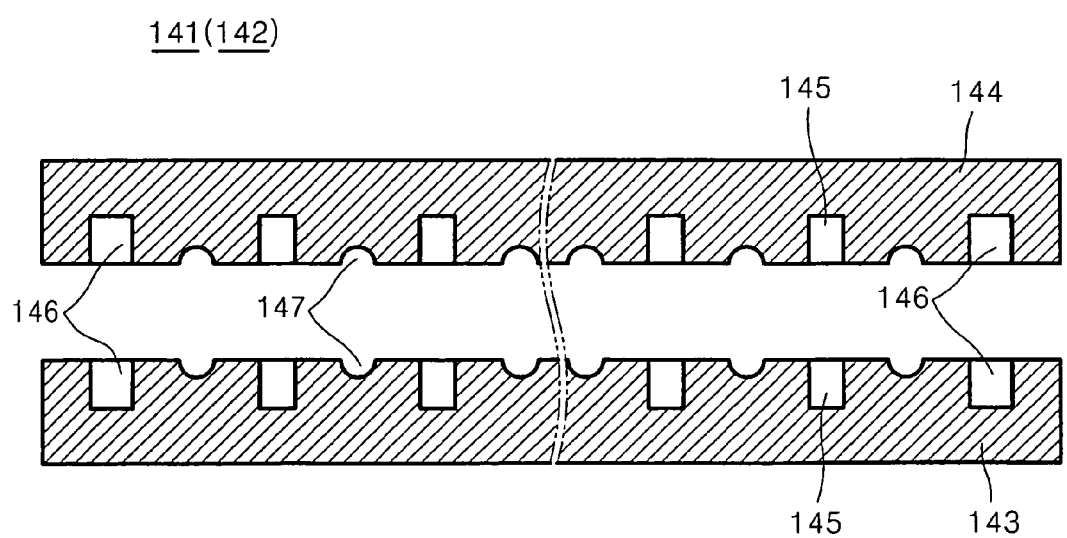
FIG. 4 is a cross-sectional view of a spacer holder employed in the thermal electron emitting backlight unit of FIG. 1 according to another embodiment of the present invention.

FIG. 4 is a cross-sectional view of a spacer holder employed in the thermal electron emitting backlight unit of FIG. 1 according to an embodiment of the present invention.

Referring to FIG. 4, the spacer holder includes a fixed spacer holder 141 fixed on a substrate 110 or 120 and a movable spacer holder 142 which is not fixed on the substrate 110 or 120. The fixed and movable spacer holders 141 and 142 respectively include a lower spacer holder 143 and an upper spacer holder 144. The lower and upper spacer holders 143 and 144 include spacer grooves 145 for mounting the spacers 151. Both ends of the lower and upper spacer holders 143 and 144 include curved spacer grooves 146 for mounting the tension spacer holder 152. Also, the lower and upper spacer holders 143 and 144 can include cathode electrode grooves 147 for mounting the cathode electrodes 160 between the spacer grooves 145 and 146. The cathode electrode grooves 147 are formed so that the cathode electrode 160 can cross the lower and upper spacer holders 143 and 144. The spacer grooves 145 and 146 are formed only at portions where the spacers 151 and 152 are to be coupled.

Referring to FIGS. 1 and 2 again, a DC voltage $V_a$ of 3 to 15 kV can be supplied to the first and second anode electrodes 112 and 122, and a DC voltage $V_c$ of a few to a few tens volts can be supplied to the cathode electrode 160 according to the material and length thereof.

Phosphor layers 114 and 124 having a predetermined thickness of, for example, 3 to 10 µm, are coated on an inner surface of the first and the second anode electrodes 112 and 122. The phosphor layers 114 and 124 are excited by thermal electrons emitted from the thermal electron emitting material layer 162 and cold electrons emitted from the electron emitting source 164 to emit visible light.

The wall frames 132 and 132 are formed by depositing frit glass with a thickness of approximately 50 µm on both surfaces of glass frame, the frit glass being located between the first anode electrode 112 and the second anode electrode 122 to form a seal therebetween by melting the frit glass.

The second anode electrode 122 can be formed of a highly reflective material, such as Al.

A phosphor layer 154 having a thickness of approximately 3 to 4 µm can further be formed on a surface of the spacers 151. Also, a reflection film 153 formed of a highly reflective material, such as Al, can be interposed between the spacer 151 and the phosphor layer 154. When the reflection film 153 is formed on the spacers 151, the reflection film 153 electrically connects the first anode electrode 112 to the second anode electrode 122. Accordingly, a voltage supplied to the first and second anode electrodes 112 and 122 are the same.

Figure 5:
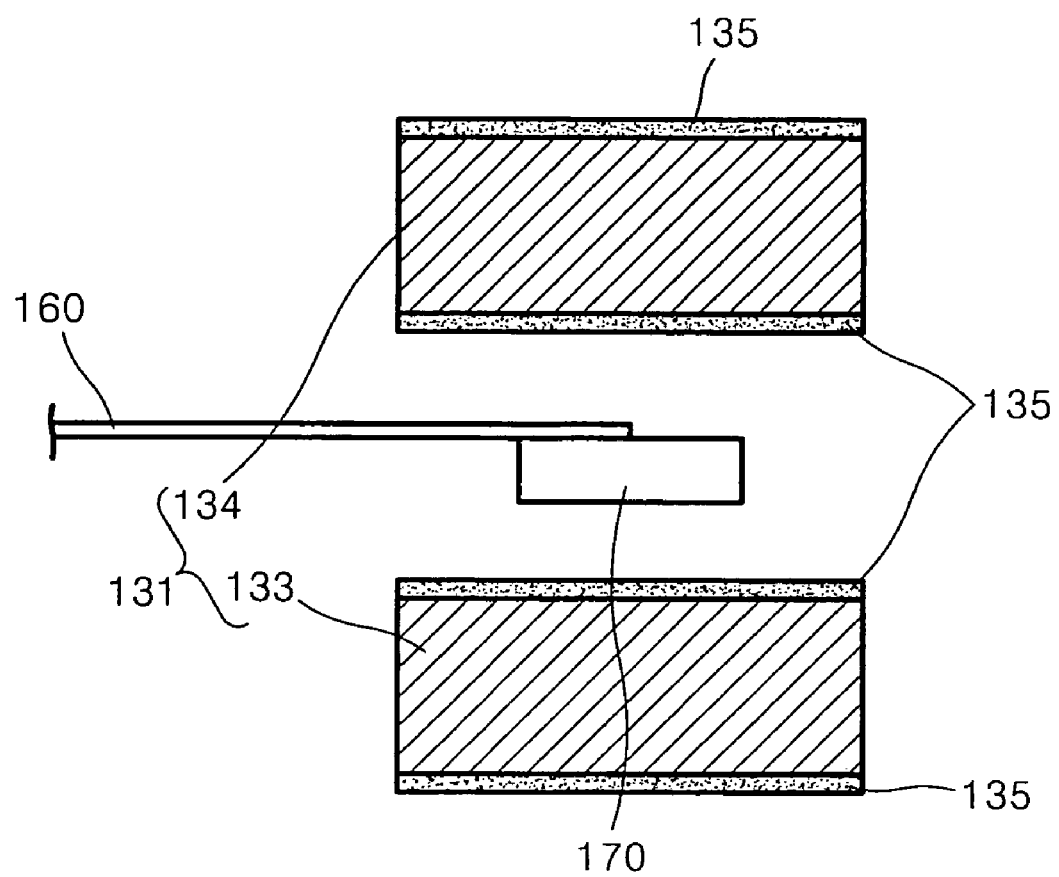
FIG. 5 is a cross-sectional view of the structure of a cathode electrode and a first wall frame in the backlight unit of FIG. 1 according to an embodiment of the present invention.

FIG. 5 is a cross-sectional view of the structure of a cathode electrode and a first wall frame in the backlight unit of FIG. 1 according to an embodiment of the present invention.

Referring to FIG. 5, the first wall frame 131 includes a lower frame 133 and an upper frame 134. Frit glass having a thickness of 50 µm is coated on an upper and lower surfaces of each of the lower and upper frames 133 and 134, such as glass frames, and a common electrode 170 is interposed therebetween. Ends of the cathode electrodes 160 are electrically connected to the common electrode 170. An end of the common electrode 170, to which a cathode voltage $V_c$ is supplied, is exposed to the outside.

The operation of the thermal electron emission field emission backlight unit of FIG. 1 according to an embodiment of the present invention is as follows.

A DC voltage of 10 kV is supplied to the first and second anode electrodes 112 and 122, and a DC voltage of 8V is supplied to the cathode electrode 160. Then, the thermal electron emitting material layer 162 emits thermal electrons to excite the phosphor layers 114 and 154. The phosphor layers 114 and 154 emit white visible light which is transmitted to an LCD panel (not shown) through the first anode electrode 112 and the first substrate 110. Also, thermal electrons traveling toward the second anode electrode 122, which is a reflection film, collide with the phosphor layer 124 to emit visible light. The visible light emitted from the phosphor layer 124 is provided to the LCD panel through the first substrate 110.

In the present embodiment, if CNTs 164 are coated on the surface of the thermal electron emitting material layer 162, cold electrons are also emitted by a field effect, and the cold electrons also excite the phosphor layers 114, 124, and 154 to emit white light.

The cathode electrode 160 can be extended during a high temperature packaging process and a vacuuming process. The tension spacers 152 push the movable spacer holder 142 away from the fixed spacer holder 141. Accordingly, the tension spacers 152 provide a tension to the cathode electrodes 160 for the cathode electrodes 160 to be suspended between the first and second anode electrodes 112 and 122.

The common electrode 170 connected to the cathode electrodes 160 is formed in a plate shape and is exposed to the outside. That is, the cathode electrodes 160 are not connected to the outside. Therefore, the cathode electrodes 160 can be prevented from being damaged by an external impact.

A thermal electron emission backlight unit according to the present invention includes tension spacers that provide a tension to the cathode electrode between a first anode electrode and a second anode electrode, and the damage of cathode electrodes can be prevented by using a common electrode formed in wall frames to be electrically connected to the cathode electrodes.

While the present invention has been particularly shown and described with reference to exemplary embodiments thereof, it will be understood by those of ordinary skill in the art that various modifications in form and can may be made therein without departing from the spirit and scope of the present invention as defined by the following claims.

What is claimed is:

1. A thermal electron emission backlight unit, comprising:
   first and second substrates arranged parallel to each other;
   first and second anode electrodes respectively arranged on inner surfaces between the first and second substrates;
   wall frames adapted to seal an inner space between the first and second substrates;
   a movable spacer holder and a fixed spacer holder arranged inside the wall frames to face each other;
   a plurality of spacers arranged between the first and second substrates and adapted to maintain a gap therebetween, wherein ends of the spacers are coupled to the movable and fixed spacer holders;
   a plurality of cathode electrodes arranged across the spacers between the first and second substrates; and
   a phosphor layer arranged on the second anode electrode;
   wherein the spacers include tension spacers adapted to provide tension between the movable and fixed spacer holders by pushing the movable spacer holder away from the fixed spacer holder; and
   wherein the first substrate is adapted to pass white light therethrough.

2. The thermal electron emission backlight unit of claim 1, wherein the wall frames facing the spacer holders respectively comprise an upper frame and a lower frame; and
   wherein common electrodes are interposed between the upper and lower frames; and
   wherein ends of the cathode electrodes are electrically connected to the common electrodes.

3. The thermal electron emission backlight unit of claim 2, wherein a flit glass is arranged on both surfaces of the upper and lower frames.

4. The thermal electron emission backlight unit of claim 1, wherein each of the movable spacer holder and the fixed spacer holder respectively comprises an upper spacer holder and a lower spacer holder; and
   wherein the upper and lower spacer holders comprise spacer grooves arranged where the spacers are coupled to the spacer holders.

5. The thermal electron emission backlight unit of claim 4, wherein the spacer grooves for the tension spacer comprise a curved shape.

6. The thermal electron emission backlight unit of claim 4, further comprising cathode grooves arranged in the upper and lower spacer holders, wherein the cathode electrodes pass through the cathode grooves.

7. The thermal electron emission backlight unit of claim 1, wherein the spacers comprise either glass or alumina ($Al_2O_3$).

8. The thermal electron emission backlight unit of claim 1, wherein the spacer holders comprise gas paths.

9. The thermal electron emission backlight unit of claim 1, wherein the second anode electrode comprises a highly reflective electrode.

10. The thermal electron emission backlight unit of claim 9, wherein the second anode electrode comprises aluminum.

11. The thermal electron emission backlight unit of claim 1, further comprising a phosphor layer arranged on a surface of the spacers.

12. The thermal electron emission backlight unit of claim 11, wherein the spacers comprise a conductive material and are adapted to electrically connect the first anode electrode to the second anode electrode.

13. The thermal electron emission backlight unit of claim 12, wherein the spacers comprise:
    a non-metal bar; and
    a reflective film arranged between a surface of the bar and the phosphor layer.

14. The thermal electron emission backlight unit of claim 1, wherein the cathode electrode comprises tungsten.

15. The thermal electron emission backlight unit of claim 14, wherein the cathode electrode has a diameter in a range of 10 μm to 250 μm.

16. The thermal electron emission backlight unit of claim 1, further comprising a thermal electron emitting material layer arranged on a circumference of the cathode electrode.

17. The thermal electron emission backlight unit of claim 16, wherein the thermal electron emitting material layer has a thickness in a range of 5 to 20 μm.

18. The thermal electron emission backlight unit of claim 16, further comprising a carbon material arranged on a surface of the thermal electron emitting material layer.

19. The thermal electron emission backlight unit of claim 1, further comprising a phosphor layer arranged on the first anode electrode.

20. The thermal electron emission backlight unit of claim 1, wherein the first anode electrode and the second anode electrode comprise flat panel shaped electrodes.

* * * * *